US007280677B2

(12) United States Patent
Chandler et al.

(10) Patent No.: US 7,280,677 B2

(45) Date of Patent: Oct. 9, 2007

(54) ELECTRONIC DEVICE INCLUDING FINGERPRINT SENSOR AND DISPLAY HAVING SELECTABLE MENU ITEMS AND ASSOCIATED METHODS

(75) Inventors: Curt M. Chandler, Satellite Beach, FL (US); Dale Raymond Setlak, Melbourne, FL (US); Arthur Leslie Stewart, Melbourne Beach, FL (US)

(73) Assignee: Authentec, Inc., Melbourne, FL (US)

( * ) Notice: Subject to any disclaimer, the term of this patent is extended or adjusted under 35 U.S.C. 154(b) by 811 days.

(21) Appl. No.: 10/683,602

(22) Filed: Oct. 10, 2003

(65) Prior Publication Data

US 2005/0078855 A1 Apr. 14, 2005

(51) Int. Cl.
*G06K 9/00* (2006.01)
*G05B 19/00* (2006.01)

(52) U.S. Cl. ...................................... 382/116; 340/5.83

(58) Field of Classification Search ........ 382/115–116, 382/124, 218, 305, 313; 340/5.82, 5.83; 455/556.2; 713/186

See application file for complete search history.

(56) References Cited

U.S. PATENT DOCUMENTS

| | | | | |
|---|---|---|---|---|
| 5,963,679 A | 10/1999 | Setlak | ........................ | 382/312 |
| 6,259,804 B1 | 7/2001 | Setlak et al. | ................ | 382/124 |
| 6,278,888 B1 | 8/2001 | Hayes, Jr. et al. | .......... | 455/566 |
| 7,129,926 B2 * | 10/2006 | Mathiassen et al. | ........ | 345/157 |
| 7,162,059 B2 * | 1/2007 | Yoo et al. | ................... | 382/124 |
| 2001/0017934 A1 | 8/2001 | Paloniemi et al. | .......... | 382/107 |
| 2004/0132490 A1 * | 7/2004 | Jerbi et al. | ............... | 455/556.1 |

FOREIGN PATENT DOCUMENTS

| | | |
|---|---|---|
| EP | 1113385 | 7/2001 |

* cited by examiner

*Primary Examiner*—Daniel Mariaam

(74) *Attorney, Agent, or Firm*—Allen, Dyer, Doppelt, Milbrath & Gilchrist, P.A.

(57) ABSTRACT

An electronic device includes a housing, a display carried by the housing, and a fingerprint sensor also carried by the housing. The electronic device may also include a processor for generating a plurality of menu items on the display, and for scrolling an indicator along the menu items based upon static placement of a finger adjacent a selected portion of the fingerprint sensor. The sensor may have a polygonal shape, and the scrolling may be in a direction of a corner portion of the polygonal shape. The menu items may be arranged in a single column, or in a plurality of columns.

57 Claims, 5 Drawing Sheets

ELECTRONIC DEVICE INCLUDING FINGERPRINT SENSOR AND DISPLAY HAVING SELECTABLE MENU ITEMS AND ASSOCIATED METHODS

FIELD OF THE INVENTION

The present invention relates to the field of personal identification and, more particularly, to the field of fingerprint sensing and processing.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes. AuthenTec, Inc., of Melbourne, Fla., offers a number of particularly advantageous fingerprint sensors under the designation numbers AF-S2, AFS5800, AES4000, AES3400, and AES2500, for example. These integrated circuit fingerprint sensors are also described in U.S. Pat. Nos. 5,963,679 and 6,259,804, for example, and operate based upon electric field sensing and have proven to be very accurate, as well as reliable.

Electronic devices sometimes use menus so that a user may select a menu item from among a plurality of menu items on the menu. More particularly, the menu items may be arranged in a column format so that the user may scroll up or down to select one of the menu items. Other electronic devices include menu items arranged in a plurality of columns so that a user may scroll up, down, or sideways to select a particular menu item. Typically, however, valuable real estate on the housing of the electronic device may be necessary to enable these scrolling and selecting features. In other words, scrolling and selecting features may require multiple switches on the housing.

Some electronic devices use fingerprint sensing applications, as well as a menu scrolling/selection application to allow a user to select a menu item from among a plurality of menu items. These electronic devices, however, may be larger and somewhat bulky due to excess sensing areas and buttons necessary to perform fingerprint sensing, scrolling through a plurality of menu items, and selection of a menu item.

An electronic device disclosed in published U.S. Patent Application Publication No. 2001/0017934 to Paloniemi et al. attempts to account for this problem by providing a sensing data input. The electronic device includes a fingerprint sensor and movement detector that is responsive to movement of the user's skin over the sensor. In other words, the movement detector is responsive to swiping movement of the user's finger over the fingerprint sensor. A fingerprint distortion problem, however, may exist with this type of sensor. Accordingly, the fingerprint sensor may not be able to properly read the user's moving fingerprint, causing delays or errors in selecting a menu item.

Moving finger detection may also require higher power consumption than is desirable by the sensor and by the associated processor that may be internal or external to the sensor. Moving finger gestures may also not be practical in situations where the sensor is mounted in close proximity to other devices, restricting finger motion. The sliding finger motions required by moving finger detection systems may not be easily performed on hand-held devices designed for one-handed operation, such as a cell phone operated by the thumb.

Movement detectors may also be disadvantageous due to excessive power consumption. Further, a movement detector that is responsive to movement of a user's finger may be impractical in situations where the motion detector is mounted in close proximity to other devices. In other words, the finger motion may cause inadvertent activation of other devices in close proximity to the motion detector.

SUMMARY OF THE INVENTION

In view of the foregoing background, it is therefore an object of the present invention to provide an electronic device having a fingerprint sensor for accurately sensing a fingerprint, and which sensor is compact, rugged, and also allows a user to scroll an indicator among a plurality of menu items.

This and other objects, features, and advantages of the present invention are provided by an electronic device comprising a housing, a display carried by the housing, and a fingerprint sensor, also carried by the housing. The electronic device may further comprise a processor for generating a plurality of menu items on the display, and for scrolling an indicator along the menu items based upon static placement of a finger adjacent a selected portion of the fingerprint sensor. Scrolling the indicator along the menu items based upon static placement is advantageously reliable, may use lower power, and may only require recognition of a lower quality image than is typically needed to detect motion of a finger.

The fingerprint sensor may comprise a fingerprint sensing area having a polygonal shape defining a plurality of spaced apart corner portions. The processor may scroll the indicator in a direction corresponding to a pointing direction of a respective corner portion upon which the user's finger is placed. In some embodiments, the polygonal shape of the fingerprint sensing area may be a diamond shape, for example.

In a first class of embodiments of the electronic device, the plurality of menu items may be arranged in a single column. In these embodiments, the plurality of spaced apart corner portions may be defined by an upper corner portion for scrolling the indicator in an upward direction portion through the menu items, and a downward corner for scrolling the indicator in a downward direction through the menu items. In addition, a first-side corner portion may be for selecting a menu item, and a second-side corner portion may be for returning to a previous menu.

In a second class of embodiments of the electronic device, the plurality of menu items may be arranged in a plurality of columns. In these embodiments, the plurality of spaced apart corner portions may be defined by an upper corner portion for scrolling the indicator in an upward direction, and a downward corner portion for scrolling the indicator in a downward direction. In addition, a first-side corner portion may be for scrolling the indicator in a direction towards a first side of the display, and a second-side corner for scrolling the indicator in a direction towards a second side of the display.

The processor may also cooperate with the fingerprint sensor to first verify an identity of a user based upon sensing a fingerprint prior to permitting scrolling. The electronic device may further comprise a memory for storing at least one authorized fingerprint. More specifically, the processor may verify the fingerprint of the user by comparing the fingerprint of the user to the authorized fingerprint stored in the memory. The processor may enable scrolling within a predetermined time window of verifying the identity of the user.

In some embodiments, the processor may be switchable to a lower power operating mode when a user's finger is not sensed on said fingerprint sensor. The fingerprint sensor may comprise a plurality of fingerprint sensing elements, and the process may determine static placement based upon a pattern of fingerprint sensing elements less than a full number of fingerprint sensing elements. In some embodiments, the electronic device may comprise logic circuitry between the processor and the sensing elements.

The plurality of menu items may comprise at least one further menu, which may include a different plurality of menu items. In some embodiments, the plurality of menu items may comprise a back item and a forward item. Accordingly, a user may readily move back and forth between selected menu items. In other embodiments, the processor may select a menu item marked with the indicator based upon a tapping of the fingerprint sensing area. Tapping may be determined based upon simultaneously detecting placement of the finger on a plurality of corner portions. In other words, if two or more corner portions are covered, a selection is determined.

The housing may comprise a handheld housing, and the electronic device may also include a power supply carried by the housing and connected to the display, fingerprint sensor, and processor. The electronic device may include circuitry connected to the processor so that the electronic device comprises a portable telephone, a pager, or a personal digital assistant (PDA), for example.

A method aspect of the present invention is for indicating a menu item from among a plurality of menu items on a display of an electronic device. The method may comprise scrolling an indicator along the menu items based upon static placement of a finger adjacent a selected portion of the fingerprint sensor.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
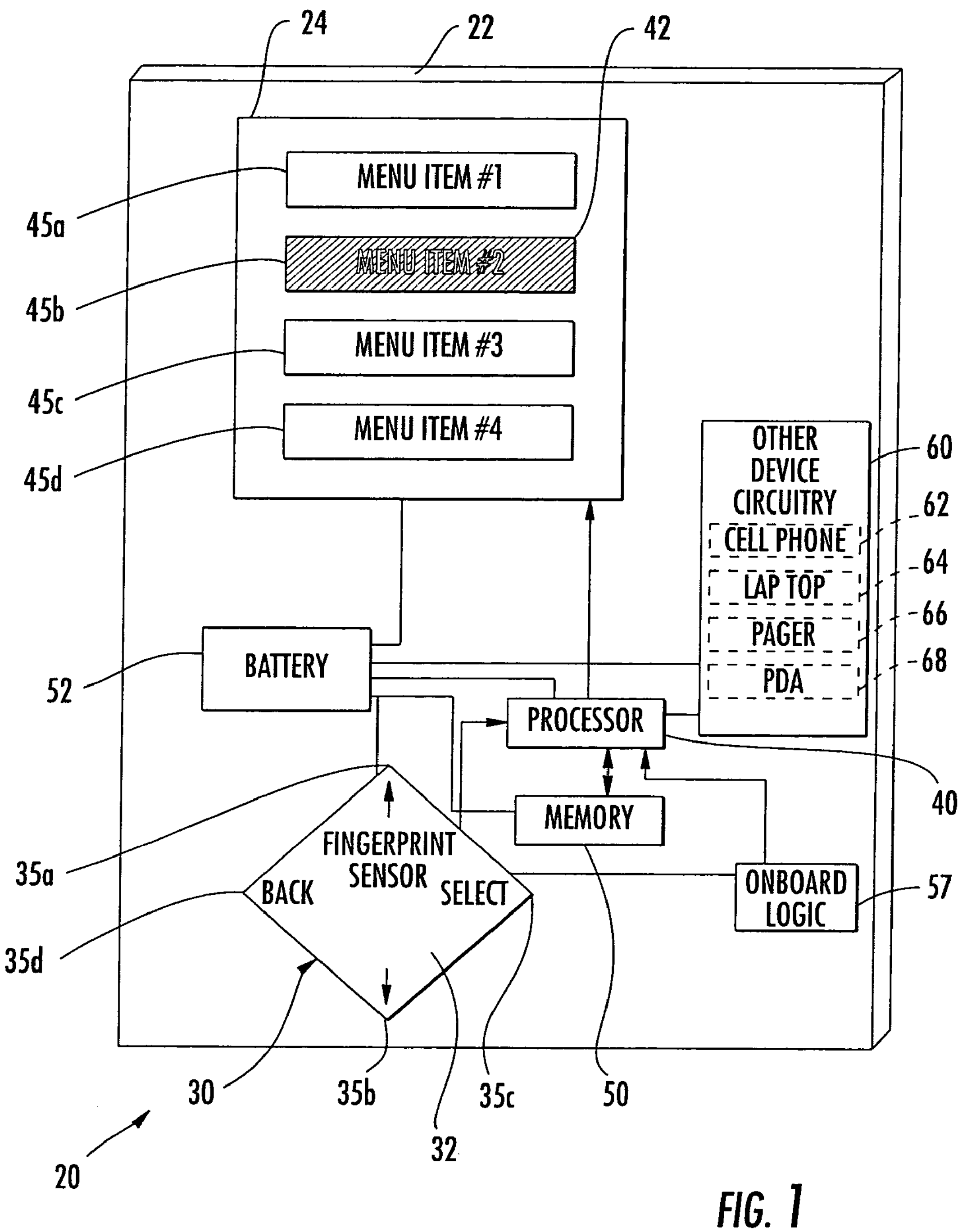
FIG. 1 is a schematic block diagram of a first embodiment of an electronic device according to the present invention.

Referring initially to FIG. 1, a first embodiment of an electronic device 20 is now described. The electronic device 20 illustratively comprises a housing 22, and a display 24 carried by the housing. The housing 22 may, in some embodiments, be a handheld housing. The display 24 may be a liquid crystal display, for example, or any other kind of display as will be appreciated by those skilled in the art. The electronic device 20 further illustratively comprises a fingerprint sensor 30 that may also be carried by the housing 22. The fingerprint sensor 30 may be similar to those disclosed in U.S. Pat. Nos. 5,963,679 and 6,259,804, assigned to the assignee of the present invention, the entire disclosures of which are incorporated herein by reference.

The electronic device 20 also illustratively includes a processor 40 for generating a plurality of menu items **45*a*-45*d* on the display 24. The processor 40 also scrolls an indicator 42 along the menu items 45*a*-45*d* based upon static placement of a user's finger adjacent a selected portion of the fingerprint sensor 30. The indicator 42 in the illustrated embodiment highlights the menu item 45*a*-45*d* to be selected by inverting the color of the menu item, e.g., menu item #2 45*b*. The indicator 42** may also be a different colored block, a pointer, for example, or any other type of indicator as understood by those skilled in the art.

Scrolling the indicator 42 through the menu items **45*a*-45*d* based upon static placement of a finger over the fingerprint sensor 30 is particularly advantageous and more reliable than other methods of scrolling through menu items. For example, other prior art approaches of scrolling are based on methods include swiping a finger over a fingerprint sensor to scroll through menu items, which may be unreliable, as some sensors tend not to pick up the swiping motion of the user's finger. Scrolling the indicator 42 through the menu items 45*a*-45*d* based upon static placement of a user's finger over the fingerprint sensor 30, however, may be more accurate and faster than these other approaches. This is also advantageous in that the electronic device 20 may be operated using one hand. Further, by scrolling the indicator 42 based upon static placement of a user's finger, other devices on the electronic device 20 are not interfered with. In other words, a user is less likely to inadvertently depress another button on the electronic device 20 when scrolling the indicator through the menu items 45*a*-45*d***.

In some embodiments, the electronic device 20 may be switched to a lower power operating mode. More specifically, the electronic device 20 may switch to the lower power operating mode when a user's finger is not present on the fingerprint sensor 30. When in the lower power operating mode, the electronic device 20 advantageously consumes less power to thereby allow longer operating time before the need to recharge or replace a power source. The electronic device 20 may simply detect when a user's finger is present on the fingerprint sensor 30 to thereby exit the lower power operating mode.

The fingerprint sensor 30 illustratively includes a fingerprint sensing area 32 having a polygonal shape defining a plurality of spaced apart corner portions **35*a*-35*d*. In one embodiment of the electronic device 20, the processor 40 scrolls the indicator 42 in a direction corresponding to a pointing direction of a respective corner portion 35*a*, 35*b*. The polygonal shape of the fingerprint sensing area 32** is illustratively a diamond, but may be any other shape, as understood by those skilled in the art.

The menu items 45*a*-45*d* are illustratively arranged in a single column. The plurality of spaced apart corner portions are illustratively defined by an upper corner portion 35*a* for scrolling the indicator 42 in an upward direction through the menu items 45*a*-45*d*, and a downward corner portion 35*b* for scrolling the indicator in a downward direction through the menu items. A first-side corner portion 35*c* is for selecting a menu item, and a second side-corner portion 35*d* is for returning to a previous menu. More specifically, static placement of the user's finger on the first-side corner portion 35*c* will select the menu item that is highlighted by the indicator 42, e.g., menu item #2 45*b*.

The processor 40 may cooperate with the fingerprint sensor 30 to first verify an identity of a user based upon sensing a fingerprint prior to permitting scrolling through the menu items 45*a*-45*d*. Indeed, sensing authorized fingerprints may be desired before displaying the menu as will be appreciated by those skilled in the art. In other embodiments, the fingerprint may be read during selective placement of the finger of the user on a corner portion although less of the overall fingerprint may be available in these embodiments.

To verify the identity of the user, the electronic device 20 illustratively comprises a memory 50 for storing at least one authorized fingerprint. The memory 50 may be embedded within the processor 40 in other embodiments. The processor 40 verifies the fingerprint of the user by comparing the fingerprint sensed on the fingerprint sensor 30 to the authorized fingerprint stored in the memory 50. More specifically, the electronic device 20 may be switched to a learning mode so that certain characteristics of authorized fingerprints may be stored into the memory 50. When in learning mode, authorized fingerprints may be added and deleted from the memory 50 of the electronic device 20, as will be appreciated by those skilled in the art.

As a security measure, the processor 40 may enable scrolling within a predetermined time window of verifying the identity of the user. In other words, if the user does not scroll through the menu items 45*a*-45*d* within the predetermined time window, the processor 40 may return to a start-up display image or otherwise lock the user out so that the user may not use the fingerprint sensor 30 to scroll through and/or select the menu items. Similarly, if the processor 40 senses inactivity for a predetermined time, it may also lock out the user. Inactivity may indicate that the user has completed use of the electronic device 20 and has merely set it down. Accordingly, the processor 40 may automatically lock the electronic device 20 so that an unauthorized user may not scroll through and/or select menu items 45*a*-45*d*.

Figure 2:
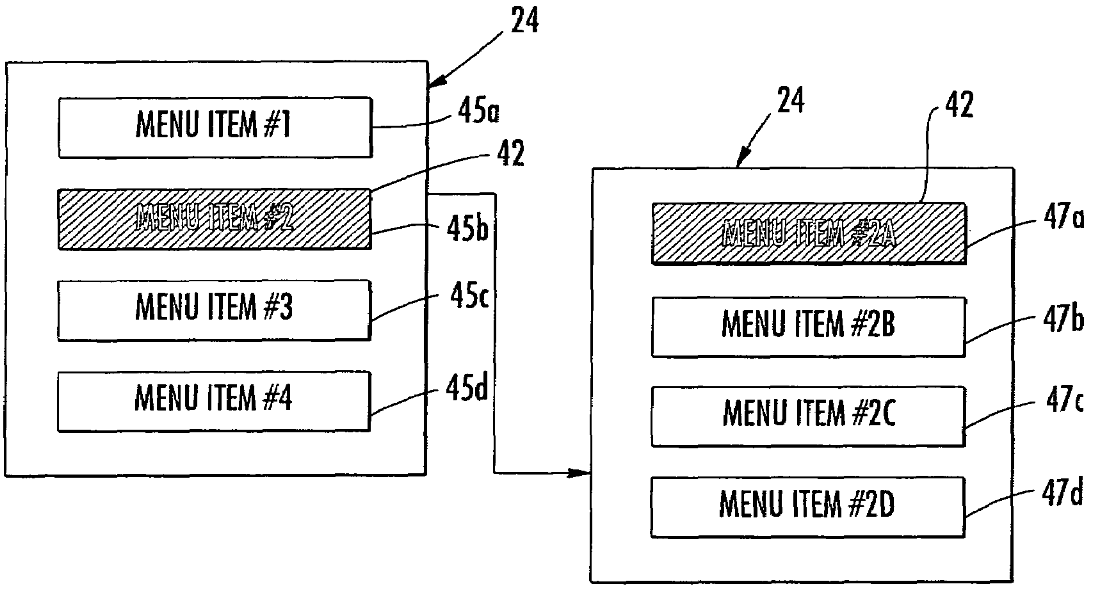
FIG. 2 is a schematic block diagram of a sequence of displayed menus of the electronic device shown in FIG. 1.

Referring additionally to FIG. 2, the process of selection of menu items 45*a*-45*d* is now further described. The plurality of menu items 45*a*-45*d* may comprise at least one further menu, which may include a different plurality of menu items 47*a*-47*d*. For example, upon selection of menu item #2 45*b*, another menu may appear on the display 24 having another plurality of menu items 47*a*-47*d*. Accordingly, a user may select from these menu items 47*a*-47*d*, which may bring the user to another set of menu items, or may go back to the previous menu items 45*a*-45*d* as will be understood by those skilled in the art. Again, an indicator 42 may be provided by inverting the color of the menu item, as illustrated by menu item #2*a* 47*a*.

The electronic device 20 also illustratively comprises a power supply in the form of a battery 52 carried by the housing 22 and connected to the display 24, fingerprint sensor 30, and processor 40. The electronic device 20 also illustratively comprises other device circuitry 60 connected to the processor 40. Accordingly, the electronic device may include the respective additional circuitry to be a portable telephone 62, a laptop computer 64, a pager 66, or a personal digital assistant (PDA) 68, for example. Of course, other circuitry may be included so that the electronic device 20 may comprise any type of device, as shall be understood by those skilled in the art.

Figure 3:
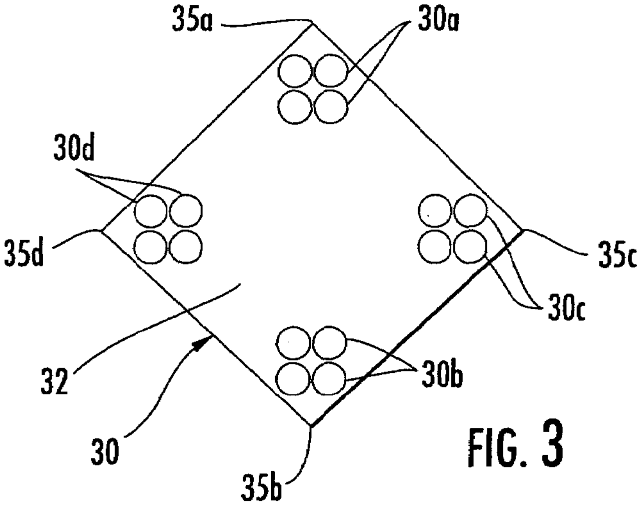
FIG. 3 is a schematic diagram illustrating fingerprint sensing elements on the fingerprint sensor of the electronic device shown in FIG. 1.

The present invention may include various implementations of logic to detect finger position. Referring more specifically to FIG. 3, the fingerprint sensor 30 may comprise a plurality of pixels, or fingerprint sensing elements 30*a*-30*d*. As will be appreciated by those skilled in the art, the pixels' size is greatly exaggerated for clarity of explanation. More particularly, the fingerprint sensor 30 may detect a user's fingerprint by scanning only a selected set of pixels. Scanning only a selected set of fingerprint sensing elements 30*a*-30*d*, rather than an entire array, may reduce power consumption, and may advantageously increase frame rate and responsiveness of the fingerprint sensor 30. In the illustrated embodiment, each of the corners 35*a*-35*d* of the fingerprint sensor 30 may include respective fingerprint sensing elements 30*a*-30*d*, which may be scanned to detect finger position. A number of other scan patterns may be used that have specific sensitivities to different aspects of the finger placement, as understood by those skilled in the art.

Given a scanned pattern, determining the position of the finger may be performed by software running on the processor 40, or, since no complex ridge patterns need to be manipulated, it may be performed in onboard logic 57. On-chip implementations may be faster than software and may use significantly less power to perform the tracking operation. In other terms, the fingerprint sensor 30 may comprise a plurality of fingerprint sensing elements. Further, the electronic device 20 illustratively includes onboard logic 57 between the sensing elements 30*a*-30*d* and the processor 40. The onboard logic 57, may determine static placement based upon a pattern of fingerprint sensing elements less than a full number of fingerprint sensing elements.

Figure 4:
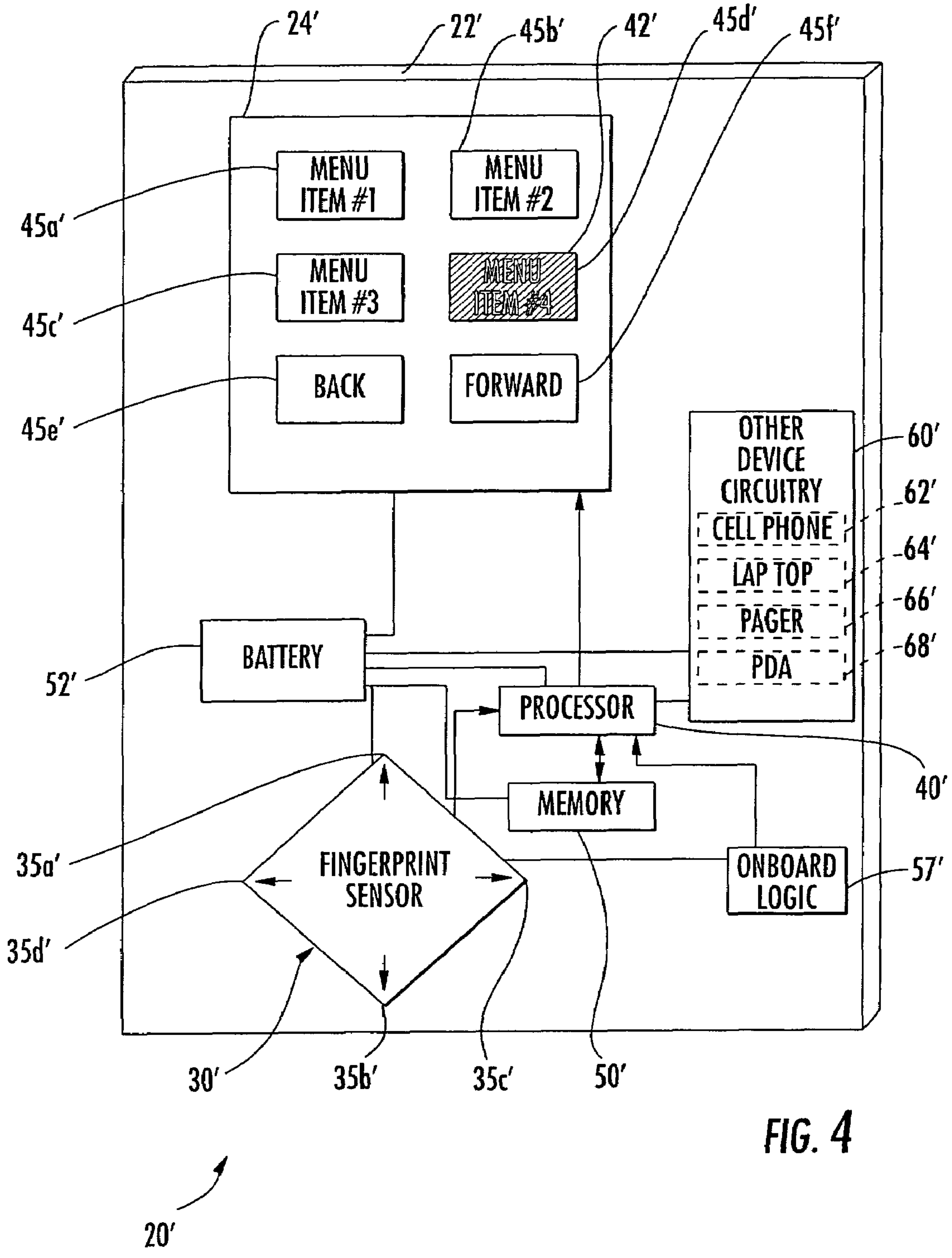
FIG. 4 is a schematic block diagram of a second embodiment of an electronic device according to the present invention.

Turning now additionally to FIG. 4, a second embodiment of the electronic device 20' is now described. In the second embodiment, the menu items 45*a*'-45*f*' are illustratively arranged in a pair of columns. Although a pair of columns are illustrated, those skilled in the art will appreciate that any number of columns may be provided. Further, the plurality of spaced apart corner portions are defined by un upper corner portion 35*a*' for scrolling the indicator 42' in an upward direction through the menu items 45*a*'-45*f*', and a downward corner portion 35*b*' for scrolling the indicator in a downward direction through the menu items. A first-side or right-side corner portion 35*c*' is for scrolling the indicator towards a first side of the display 24', and a second-side or left-side corner portion 35*d*' is for scrolling the indicator towards a second side of the display. Accordingly, static contact by a finger over a desired corner portion (leaving the other corner portion uncovered) causes scrolling in the direction of the contacted corner portion.

The plurality of menu items may also comprise a back item 45*e*' and a forward item 45*f*'. More particularly, the back item 45*e*' may be selected when the user wishes to scroll through menu items on a previous menu, and the forward item 45*f*' may be selected when the user wishes to scroll through menu items on a subsequent menu. The processor 40' may select the menu item 45*a*'-45*f*' marked with the indicator 42' based upon a tapping of the fingerprint sensing area 32'. Of course, other contact with the fingerprint sensing area 32' may also be used to select the menu item 45*a'*-45*f'* marked with the indicator 42'. The other elements of the second embodiment of the electronic device 20' are similar to those of the first embodiment, are marked with prime notation, and require no further discussion herein.

Figure 5:
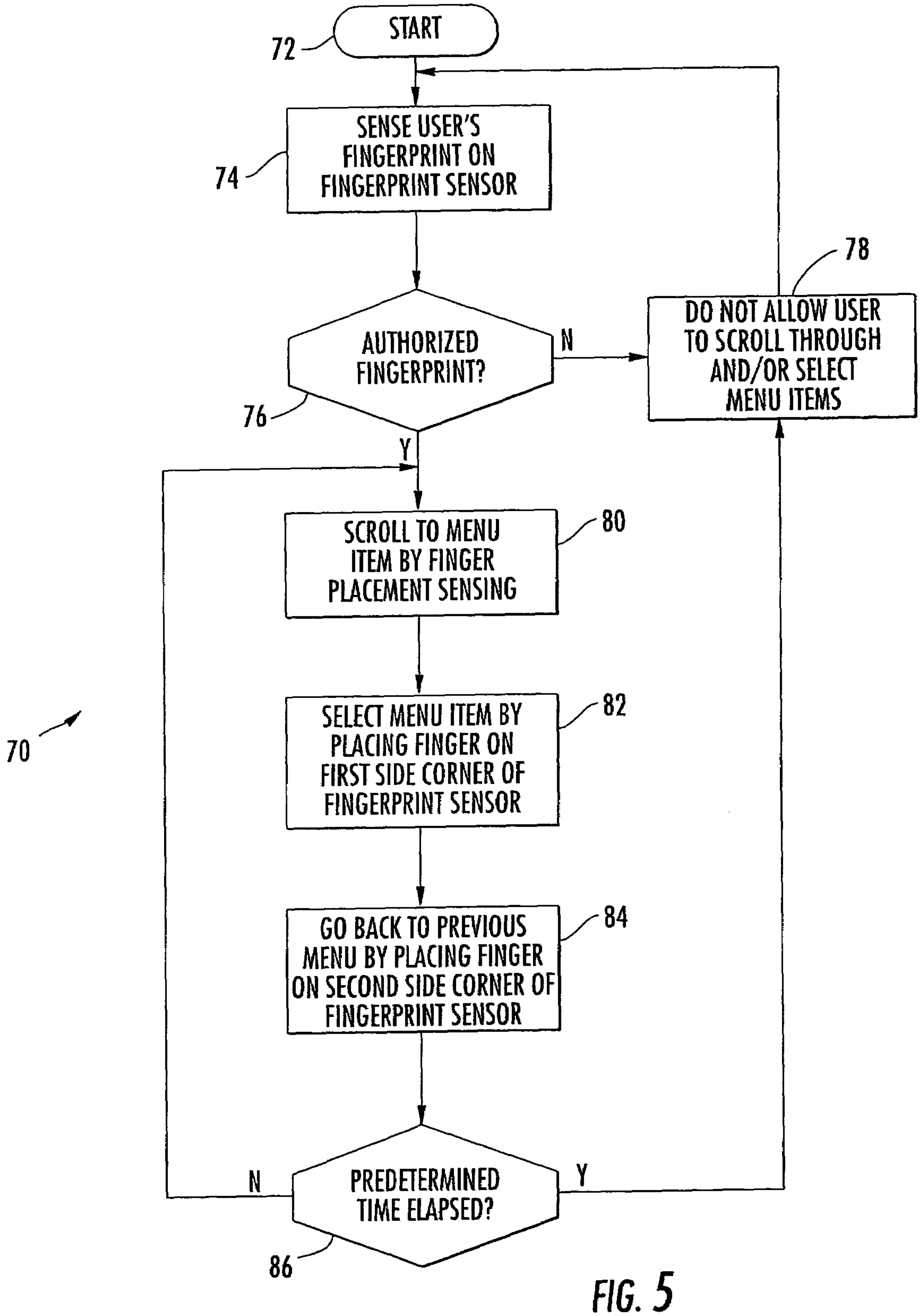
FIG. 5 is a flow chart illustrating a first embodiment of a method for indicating and selecting a menu item according to the present invention.

Turning now additionally to the flow chart 70 of FIG. 5, a method of indicating and selecting a menu item from among a plurality of menu items 45*a*-45*d* on a display 42 of an electronic device 20 is now described. From the start (Block 72), a user's fingerprint is sensed on the fingerprint sensor 30 at Block 74. At Block 76, it is determined whether the sensed fingerprint is an authorized fingerprint. If it is determined at Block 76 that the sensed fingerprint is an authorized fingerprint, then the user is allowed to scroll to a menu item in a column of menu items 45*a*-45*d* by sensing finger placement on an upper or lower corner portion of the fingerprint sensor 30 at Block 80. If, however, it is determined at Block 76 that the sensed fingerprint is not an authorized fingerprint, then the user is not allowed to scroll through or select menu items 45*a*-45*d* at Block 78.

At Block 82, a menu item is selected from among the plurality of menu items 45*a*-45*d* by placing a finger of the user on a first-side corner portion 35*c* of the fingerprint sensor 30. At Block 84, the user may go back to a previous menu by placing a finger on a second-side corner portion 35*d* of the fingerprint sensor 30.

At Block 86, it is determined whether a predetermined time of inactivity has elapsed after an authorized fingerprint was sensed. If it is determined at Block 86 that the predetermined time has elapsed, then the user is not allowed to continue. If, however, it is determined at Block 86 that the predetermined time has not elapsed, then the user is allowed to scroll through and select other menu items 45*a*-45*d* at Blocks 80 and 82.

Figure 6:
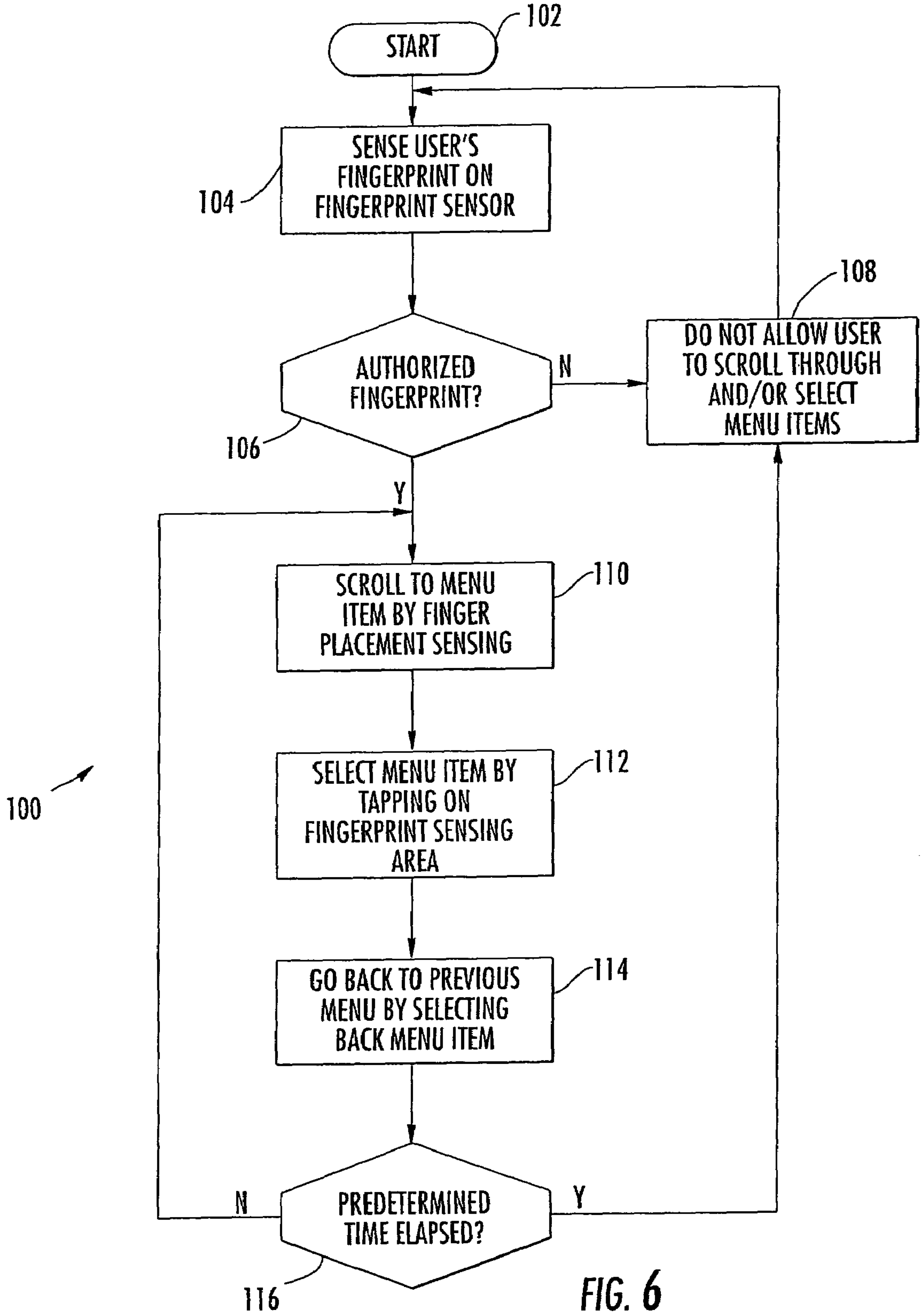
FIG. 6 is a flow chart illustrating a second embodiment of a method for indicating and selecting a menu item according to the present invention.

Turning now additionally to the flow chart 100 of FIG. 6, a second embodiment of the method of indicating and selecting a menu item from among a plurality of menu items 45*a'*-45*f'* on a display 42' of an electronic device 20' is now described. From the start (Block 102), a user's fingerprint is sensed on the fingerprint sensor 30' at Block 104. At Block 106, it is determined whether the sensed fingerprint is an authorized fingerprint. If it is determined at Block 106 that the sensed fingerprint is an authorized fingerprint, then the user is allowed to scroll to a menu item 45*a'*-45*f'* by sensing finger placement on respective corner portions of the fingerprint sensor 30 at Block 110. If, however, it is determined at Block 106 that the sensed fingerprint is not an authorized fingerprint, then the user is not allowed to scroll through or select menu items 45*a'*-45*f'* at Block 108.

At Block 112, a menu item from among a plurality of menu items 45*a'*-45*f'* is selected by tapping a finger on the fingerprint sensing area 32'. By tapping, a user's finger will be placed upon a plurality of corner portions. Based upon detection of placement of the finger on the two or more corner portions, the user's selection is determined by the processor. At Block 114, the user may go back to a previous menu by selecting a back menu item 35*e'*.

At Block 116, it is determined whether a predetermined time of inactivity has elapsed after an authorized fingerprint was sensed. If it is determined at Block 116 that the predetermined time has elapsed, then the user is not allowed to continue. If, however, it is determined at Block 116 that the predetermined time has not elapsed, then the user is allowed to scroll through and select other menu items 45*a'*-45*f'* at Blocks 110 and 112.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An electronic device comprising:

a housing;

a display carried by said housing;

a fingerprint sensor carried by said housing and comprising a fingerprint sensing area having a polygonal shape defining a plurality of spaced apart corner portions, each corner portion defining a respective pointing direction; and a processor for generating a plurality of menu items on said display, and for scrolling an indicator along the menu items in a respective pointing direction based upon static placement of a finger adjacent a corresponding corner portion of the fingerprint sensing area.

2. An electronic device according to claim 1 wherein the polygonal shape of said fingerprint sensing area is a diamond shape.

3. An electronic device according to claim 2 wherein the plurality of menu items are arranged in a single column; and wherein the plurality of spaced apart corner portions are defined by an upper corner portion for scrolling the indicator in an upward direction through the menu items, a downward corner portion for scrolling the indicator in a downward direction through the menu items, a first-side corner portion for selecting a menu item, and a second-side corner portion for returning to a previous menu.

4. An electronic device according to claim 2 wherein the plurality of menu items are arranged in a plurality of columns; and wherein the plurality of spaced apart corner portions are defined by an upper corner portion for scrolling the indicator in an upward direction through the menu items, a downward corner portion for scrolling the indicator in a downward direction through the menu items, a first-side corner portion for scrolling the indicator in a direction towards a first side of said display through the menu items, and a second-side corner portion for scrolling the indicator in a direction towards a second side of said display through the menu items.

5. An electronic device according to claim 1 wherein said processor cooperates with said fingerprint sensor to first verify an identity of a user based upon sensing a fingerprint prior to permitting scrolling.

6. An electronic device according to claim 5 further comprising a memory for storing at least one authorized fingerprint; and wherein said processor verifies the fingerprint of the user by comparing the fingerprint of the user to the at least one authorized fingerprint stored in the memory.

7. An electronic device according to claim 5 wherein said processor enables scrolling within a predetermined time window of verifying the identity of the user.

8. An electronic device according to claim 1 wherein said processor is switchable to a lower power operating mode when a user's finger is not sensed on said fingerprint sensor.

9. An electronic device according to claim 1 wherein said fingerprint sensor comprises a plurality of fingerprint sensing elements; and wherein said processor determines static placement based upon a pattern of fingerprint sensing elements less than a full number of fingerprint sensing elements.

10. An electronic device according to claim 9 further comprising logic circuitry between said processor and said sensing elements.

11. An electronic device according to claim 1 wherein the plurality of menu items comprises at least one further menu comprising a different plurality of menu items.

12. An electronic device according to claim 1 wherein the plurality of menu items comprises a back item and a forward item.

13. An electronic device according to claim 1 wherein said processor selects the menu item marked with the indicator based upon a tapping of the fingerprint sensing area.

14. An electronic device according to claim 13 wherein said processor determines tapping of the fingerprint sensing area based upon sensing of finger placement over a plurality of corner portions.

15. An electronic device according to claim 1 wherein said housing comprises a handheld housing.

16. An electronic device according to claim 1 further comprising a power supply carried by said housing and connected to said display, fingerprint sensor, and processor.

17. An electronic device according to claim 1 further comprising circuitry connected to said processor so that the electronic device comprises at least one of a portable telephone, a pager, a laptop computer, and a personal digital assistant (PDA).

18. An electronic device comprising:

a housing;

a display carried by said housing;

a fingerprint sensor carried by said housing and comprising a fingerprint sensing area having a diamond shape defining a plurality of spaced apart corner portions; and a processor for generating a plurality of menu items on said display arranged in at least one column, and for scrolling an indicator along the at least one column of menu items based upon static placement of a finger adjacent a pointing direction of a respective corner portion of the fingerprint sensing area.

19. An electronic device according to claim 18 wherein the at least one column of menu items comprises a single column of menu items; and wherein the plurality of spaced apart corner portions are defined by an upper corner portion for scrolling the indicator in an upward direction through the menu items, a downward corner portion for scrolling the indicator in a downward direction through the menu items, a first-side corner portion for selecting a menu item, and a second-side corner portion for returning to a previous menu.

20. An electronic device according to claim 18 wherein the at least one column of menu items comprises a plurality of columns of menu items; and wherein the plurality of spaced apart corner portions are defined by an upper corner portion for scrolling the indicator in an upward direction through the menu items, a downward corner portion for scrolling the indicator in a downward direction through the menu items, a first-side corner portion for scrolling the indicator in a direction towards a first side of said display through the menu items, and a second-side corner portion for scrolling the indicator in a direction towards a second side of said display through the menu items.

21. An electronic device according to claim 18 wherein said processor cooperates with said fingerprint sensor to first verify an identity of a user based upon sensing a fingerprint prior to permitting scrolling.

22. An electronic device according to claim 21 further comprising a memory for storing at least one authorized fingerprint; and wherein said processor verifies the fingerprint of the user by comparing the fingerprint of the user to the at least one authorized fingerprint stored in the memory.

23. An electronic device according to claim 21 wherein said processor enables scrolling within a predetermined time window of verifying the identity of the user.

24. An electronic device according to claim 18 wherein said processor is switchable to a lower power operating mode when a user's finger is not sensed on said fingerprint sensor.

25. An electronic device according to claim 18 wherein said fingerprint sensor comprises a plurality of fingerprint sensing elements; and wherein said processor determines static placement based upon a pattern of fingerprint sensing elements less than a full number of fingerprint sensing elements.

26. An electronic device according to claim 18 wherein the plurality of menu items comprises at least one further menu comprising a different plurality of menu items.

27. An electronic device according to claim 18 wherein the plurality of menu items comprises a back item and a forward item.

28. An electronic device according to claim 18 wherein said processor selects the menu item marked with the indicator based upon a tapping of the fingerprint sensing area.

29. An electronic device according to claim 28 wherein said processor determines tapping of the fingerprint sensing area based upon sensing of finger placement over a plurality of corner portions.

30. An electronic device according to claim 18 further comprising circuitry connected to said processor so that the electronic device comprises at least one of a portable telephone, a pager, a laptop computer, and a personal digital assistant (PDA).

31. An electronic device comprising:

a housing;

a display carried by said housing;

a fingerprint sensor carried by said housing and comprising a fingerprint sensing area having a diamond shape defining a plurality of spaced apart corner portions; and a processor for generating a plurality of menu items on said display arranged in a plurality of columns, and for scrolling an indicator along the menu items based upon placement of a finger adjacent a selected portion of said fingerprint sensor;

said spaced apart corner portions of said fingerprint sensor defined by an upper corner portion for scrolling the indicator in an upward direction through the menu items, a downward corner portion for scrolling the indicator in a downward direction through the menu items, a first-side corner portion for scrolling the indicator in a direction towards a first side of said display through the menu items, and a second-side corner portion for scrolling the indicator in a direction towards a second side of said display through the menu items.

32. An electronic device according to claim 31 wherein the processor scrolls the indicator along the menu items based upon static placement of a finger adjacent a selected portion of said fingerprint sensor.

33. An electronic device according to claim 31 wherein said processor cooperates with said fingerprint sensor to first verify an identity of a user based upon sensing a fingerprint prior to permitting scrolling.

34. An electronic device according to claim 33 further comprising a memory for storing at least one authorized fingerprints and wherein said processor verifies the fingerprint of the user by comparing the fingerprint of the user to the at least one authorized fingerprint stored in the memory.

35. An electronic device according to claim 33 wherein said processor enables scrolling within a predetermined time window of verifying the identity of the user.

36. An electronic device according to claim 31 wherein said processor is switchable to a lower power operating mode when a user's finger is not sensed on said fingerprint sensor.

37. An electronic device according to claim 31 wherein said fingerprint sensor comprises a plurality of fingerprint sensing elements; and wherein said processor determines static placement based upon a pattern of fingerprint sensing elements less than a full number of fingerprint sensing elements.

38. An electronic device according to claim 31 wherein the plurality of menu items comprises at least one further menu comprising a different plurality of menu items.

39. An electronic device according to claim 31 wherein the plurality of menu items comprises a back item and a forward item.

40. An electronic device according to claim 31 wherein said processor selects the menu item marked with the indicator based upon a tapping of the fingerprint sensing area.

41. An electronic device according to claim 40 wherein said processor determines tapping of the fingerprint sensing area based upon sensing of finger placement over a plurality of corner portions.

42. An electronic device according to claim 31 further comprising circuitry connected to said processor so that the electronic device comprises at least one of a portable telephone, a pager, a laptop computer, and a personal digital assistant (PDA).

43. An electronic device comprising:

a housing;

a display carried by said housing;

a fingerprint sensor carried by said housing and comprising a fingerprint sensing area having a diamond shape defining a plurality of spaced apart corner portions; and a processor for generating a plurality of menu items on said display, and for selecting a menu item based upon a tapping of the fingerprint sensing area as determined by sensing finger placement over a plurality of corner portions.

44. An electronic device according to claim 43 wherein said processor cooperates with said fingerprint sensor to first verify an identity of a user based upon sensing a fingerprint prior to permitting scrolling.

45. An electronic device according to claim 44 further comprising a memory for storing at least one authorized fingerprint; and wherein said processor verifies the fingerprint of the user by comparing the fingerprint of the user to the at least one authorized fingerprint stored in the memory.

46. An electronic device according to claim 44 wherein said processor is switchable to a lower power operating mode when a user's finger is not sensed on said fingerprint sensor.

47. An electronic device according to claim 43 further comprising circuitry connected to said processor so that the electronic device comprises at least one of a portable telephone, a pager, a laptop computer, and a personal digital assistant (PDA).

48. A method of indicating a menu item from among a plurality of menu items on a display of an electronic device comprising a fingerprint sensing area having a polygonal shape defining a plurality of spaced apart corner portions, each corner portion defining a respective pointing direction, the method comprising:

scrolling an indicator between the plurality of menu items in a respective pointing direction based upon static placement of a finger adjacent a corresponding corner portion of the fingerprint sensing area.

49. A method according to claim 48 wherein the polygonal shape of the fingerprint sensing area is a diamond shape.

50. A method according to claim 49 wherein the plurality of menu items are arranged in a single column; and wherein the plurality of spaced apart corner portions are defined by an upper corner portion for scrolling the indicator in an upward direction through the menu items, a downward corner portion for scrolling the indicator in a downward direction through the menu items, a first-side corner portion for selecting a menu item, and a second-side corner portion for returning to a previous menu.

51. A method according to claim 49 wherein the plurality of menu items are arranged in a plurality of columns; and wherein the plurality of spaced apart corner portions are defined by an upper corner portion for scrolling the indicator in an upward direction through the menu items, a downward corner portion for scrolling the indicator in a downward direction through the menu items, a first-side corner portion for scrolling the indicator in a direction towards a first side of said display through the menu items, and a second-side corner portion for scrolling the indicator in a direction towards a second side of said display through the menu items.

52. A method according to claim 48 further comprising first verifying an identity of a user based upon sensing a fingerprint prior to permitting scrolling.

53. A method according to claim 52 further comprising storing at least one authorized fingerprint in a memory; and wherein verifying further comprises comparing the fingerprint of the user to the at least one authorized fingerprint stored in the memory.

54. A method according to claim 52 further comprising enabling scrolling within a predetermined time window of verifying the identity of the user.

55. A method according to claim 48 further comprising switching a processor of the electronic device to a lower power operating mode when a user's finger is not sensed on the fingerprint sensing area.

56. A method according to claim 48 wherein the fingerprint sensing area comprises a plurality of fingerprint sensing elements; and wherein static placement of a finger is determined based upon a pattern of fingerprint sensing elements less than a full number of fingerprint sensing elements.

57. A method according to claim 48 further comprising tapping the fingerprint sensing area to select the menu item marked with the indicator.

* * * * *

UNITED STATES PATENT AND TRADEMARK OFFICE

CERTIFICATE OF CORRECTION

PATENT NO. : 7,280,677 B2
APPLICATION NO. : 10/683602
DATED : October 9, 2007
INVENTOR(S) : Chandler et al.

It is certified that error appears in the above-identified patent and that said Letters Patent is hereby corrected as shown below:

| | |
|---|---|
| Title page (73) (ASSIGNEE) | Delete: "Authentec"<br>Insert: -- AuthenTec -- |
| Title page (56) (REF. CITED) | Insert missing Data: -- 5,828,773 10/1998 Setlak ………. 382/126 -- |
| Column 10, Line 67 | Delete: "fingerprints"<br>Insert: -- fingerprint; -- |

Signed and Sealed this

Seventeenth Day of June, 2008

JON W. DUDAS
*Director of the United States Patent and Trademark Office*